Figure 1:
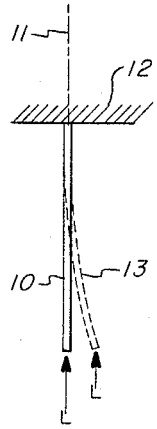

Oct. 4, 1966    F. SAPHRA    3,276,272
ANGULAR SPEED RESPONSIVE DEVICE
Original Filed Nov. 14, 1960    2 Sheets-Sheet 1

INVENTOR.
FREDERICK SAPHRA
BY
ATTORNEY

United States Patent Office 3,276,272
Patented Oct. 4, 1966

3,276,272
ANGULAR SPEED RESPONSIVE DEVICE
Frederick Saphra, Levittown, N.Y., assignor to Sperry Rand Corporation, a corporation of Delaware
Original application Nov. 14, 1960, Ser. No. 68,895, now Patent No. 3,129,301, dated Apr. 14, 1964. Divided and this application June 27, 1963, Ser. No. 291,071
6 Claims. (Cl. 74—5.7)

This invention relates to a device that it responsive to the angular speed of a rotating member wherein the device provides little or no deflection with increasing load up to a critical speed and at and beyond that speed provides an appreciable increase in the rate of deflection with slight increase in speed. The present invention is particularly adaptable for use as a switch or as a governor for rotating machinery. The present application is a division of United States patent application S.N. 68,895 filed November 14, 1960, now Patent Number 3,129,301.

It is particularly useful as a governor to maintain extremely precise angular speed regulation of, for example, a gyroscopic rotor. Previously, this required a regulated power source which in the case of an A.C. electrically driven rotor required a constant frequency power supply and in the case of a pneumatically driven rotor necessitated a constant pressure source. Regulated power sources of this type are extremely expensive to construct and in certain airborne applications they are undesirably cumbersome and unduly heavy. Another known method is to measure the gyro rotor speed against a fixed frequency or angular speed standard and when the speed limit determined by the standard is exceeded the power to the gyro rotor is cut off. This necessitates auxiliary equipment external to the gyro rotor which is unduly complex and unnecessarily heavy. Further, the prior art devices are relatively inaccurate and subject to variations due to changes in the ambient temperature.

The present invention overcomes the undesirable limitations of the prior art devices by providing a simple, compact angular speed responsive device which fits within the rotor itself. The device is completely self-contained and does not require any external adjustment or auxiliary equipment. The device is extremely accurate and equally applicable to electrically and pneumatically driven rotating machines.

It is an object of the present invention to proivde a device responsive to the angular speed of a rotating member which exhiibts a low rate of deflection versus speed until a predetermined critcal speed is reached and thereafter an appreciable increase in the rate of deflection is exhibited.

It is a further object of the present invention to provide a self-contained, extremely accurate, compact switch responsive to the angular speed of a rotating member which provides a switching action at a predetermined critical speed.

It is another object of the present invention to provide a simple governor device that is adapted for mounting within the rotating member for regulating the angular speed of said member.

The above objects are achieved by the present invention by means of a device responsive to the angular speed of a rotating member comprising a deflectable conditionally stable elastic column mounted for rotation with the rotating member, the column being relatively long along its longitudinal axis with respect to its cross-sectional area and having a non-linear elasticity characteristic whereby at a critical load associated with the critical angular speed of the member an appreciable increase in the rate of deflection versus load occurs and load-producing means rotating with the member for applying a load to the column representative of the angular speed of the member to thereby abruptly deflect the column at the critical speed of the member.

Figure 2:
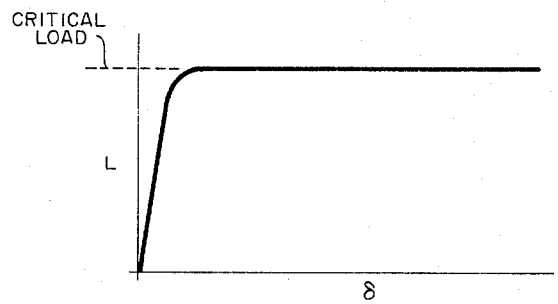
Figure 4:
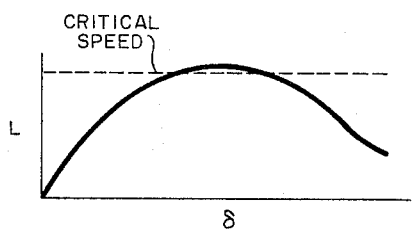
Figure 3:
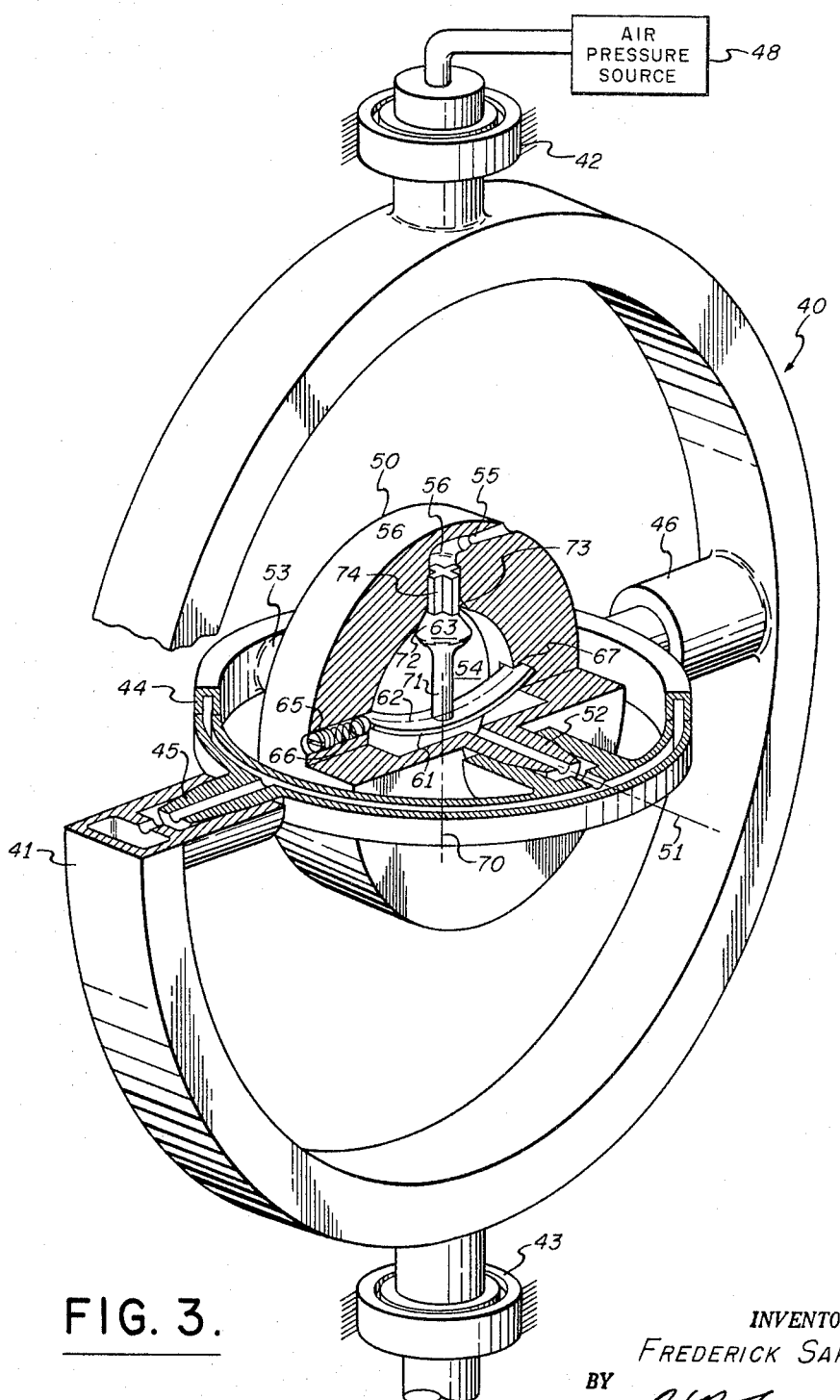

Referring now to the drawings,
FIG. 1 is a schematic view showing a column loaded in accordance with the theory of the present invention;
FIG. 2 is a graph showing the load versus deflection characteristic of the column of FIG. 1;
FIG. 3 is a perspective view partially in section of a pneumatically driven gyroscope that is governed by another embodiment of the present invention; and
FIG. 4 is a graph showing the load versus deflection characteristic of the column of FIG. 3.

The operation of the present invention is based upon Euler's theory relating to long columns. Referring to FIG. 1, in accordance with Euler's theory, a long column 10 which is fixed at one end 12 will fail by buckling at a load L less than the elastic limit of the material of the column 10 when the load L is applied in a direction along the longitudinal axis 11 of the column 10. A sudden lateral deflection, as indicated by the dotted line 13, will occur under some critcal load and the column 10 is then no longer in equilibrium. The column 10 is thus conditionally stable, i.e., stable below the critical load and unstable at and above the critical load.

By viewing FIG. 2 wherein the load L is plotted against the deflection $\delta$, the abruptness of the rate of increase of deflection at the critical load can be appreciated. A very sharp knee of the curve of FIG. 2 exists when the critical or Euler load is reached. The sharpness of the knee depends upon the general symmetry of the system; the greater the symmetry, the sharper the knee. This extremely radical change of the load-deflection curve around the critical load with the deflection rate becoming extremely high after the critical load has been reached is utilized in the present invention to provide a sensitivity to small changes in speed at a predetermined critical speed.

The present invention will now be described with respect to a governor for pneumatically driven gyroscopic rotors. It will be appreciated, however, that the present invention is equally adaptable to operate as a device responsive to the angular speed of a rotating member other than a gyroscopic rotor and as other than a governor.

A governor which operates on this basic principle is shown applied in FIG. 3 to a pneumatically driven director gyro 40. The gyro 40 is supported in a conventional manner for movement around a vertical axis by means of a hollow outer gimbal 41 which is rotatably supported on a chassis, not shown, by means of spaced bearings 42 and 43. A hollow inner gimbal 44 is in turn rotatably supported about a horizontal axis by means of spaced air bearings 45 and 46 disposed on the outer gimbal 41. The inner gimbal 44 in turn rotatably supports the rotor 50 for rotation about its spin axis 51 by means of spaced air bearings 52 and 53.

The rotor 50 is a hollow, pneumatically driven, reaction-turbine-type rotor which is driven by means of air from an air pressure source 48. For ease of manufacturing, the rotor 50 is constructed of two parts that are bolted or otherwise fastened to each other in a conventional manner, not shown. The air pressure source 48 is connected to provide air through conduits in the hollow bearing 42, the hollow outer gimbal 41, the air bearings 45 and 46, the hollow inner gimbal 44, the air bearings 52 and 53 to a centrally disposed inner cavity 54 within the hollow rotor 50. The rotor 50 further includes a reaction nozzle 55 connected by means of a conduit 56 to the cavity 54.

The governor 60 of the present invention is also disposed within the cavity 54. The governor 60 comprises a thin, flat, elastic column 61 having a longitudinal axis 62, a weight or mass 63 which also serves as a throttling valve in a manner to be described, and a set screw 65 and associated helical biasing spring 66. In this embodiment of the present invention, the column 61 is a long column in accordance with the aforementioned Euler theory and it is diametrically disposed within the cavity 54. The column 61 is pre-buckled a predetermined amount by means of the set screw 65 which is screwed to the rotor 50 and bears against a spring 66 which in turn abuts against one end of the column 61 to apply a preload in a direction along the axis 62. The other end of the column 61 is constrained in a slot 67 in the rotor 50.

The mass 63 is disposed with its longitudinal axis 70 perpendicular to the longitudinal axis 62 of the column 61. The lower portion of the mass 63 is in the form of a rod 71 which has its lower extremity fastened to the center of the bowed column 61. The mass 63 in addition to serving as a weight also has an enlarged central portion 72 which cooperates with a matching portion 73 of the conduit 56 to operate as a poppet or throttling valve. The upper portion 74 of the mass 63 is fluted to permit the passage of air through the conduit 56 when the poppet valve portion 72 is not closed.

In order to provide proportional control of the air flow through the nozzle 55 the column 61 has a load versus deflection characteristic as shown in FIG. 4. This provides proportional control and thus extremely precise angular speed regulation of the rotor 50 in a manner to be described. The mass 63 is designed to provide a centrifugal force which results in an extremely high rate of deflection versus load when the critical load is reached at the desired or critical speed.

In operation, when the gyro 40 is started, the high pressure air from the source 48 is provided through the conduits to the cavity 54 and thence through the fluted portion 74 of the mass 63 and the conduit 56 to the reaction nozzle 55 where it produces a reaction force on the rotor 50 causing it to spin about its axis 51 in a counterclockwise direction as indicated by the arrow.

As the rotor 50 approaches its desired or critical angular speed, the mass 63 will, due to centrifugal action, apply a force radially in an outward direction along the axis 71 which will be transmitted to the attached column 61. The column 61 will deflect as a result of this load in accordance with the graph of FIG. 4 thereby causing the poppet valve portion 72 of the mass 63 to begin to throttle the air through the conduit 56 and thus the nozzle 55.

At and above the critical speed, the load applied by the mass 63 is critical and the rate of deflection versus load is a maximum thereby closing off the air supply to the nozzle 55 causing the rotor 50 to slow down. As the angular speed of the rotor 50 goes below the critical speed, the valve 72 again opens in accordance with the graph of FIG. 4 and permits air to flow through the nozzle 55 thereby causing the rotor 50 to increase its speed. The speed regulation is extremely fine in the region in which the velocity of the rotor has to be governed since the throttling effect in this embodiment of the invention is continuous and proportional instead of "on-off."

It will be appreciated that the invention relies on the non-linear behavior of conditionally stable elastic columns and takes advantage of the very large increase of deflection with little or no increase in load once the range of critical stability has been reached. The present invention provides extremely accurate speed regulation in spite of wide variation in the pressure of the pressure fluid source.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In combination, a gyroscopic rotor rotated by means of a source of energy, deflectable means mounted for rotation with said rotor having a non-linear deflection characteristic whereby at a critical angular speed of said rotor an appreciable and abrupt deflection occurs, and means responsive to said deflection for controlling the energy supplied to rotate said rotor as a function of said deflection thereby precisely regulating the angular speed of said rotor.

2. A governor for a fluid actuated gyroscopic rotor driven by a source of pressure fluid by means of a nozzle comprising a deflectable conditionally stable elastic column mounted for rotation with said rotor, said column being relatively long along its longitudinal axis with respect to its cross-sectional area and having a non-linear elasticity characteristic whereby at a critical load associated with a critical angular speed of said rotor an appreciable increase in the rate of deflection versus load occurs, load-producing means rotating with said rotor for applying a load to said column representative of the angular speed of said rotor for deflecting said column, and means responsive to the deflection of said column for controlling the flow of pressure fluid through said nozzle in accordance therewith thereby precisely regulating the angular speed of said rotor.

3. A governor for a gas actuated gyroscopic rotor driven by a source of pressure gas by means of a reaction nozzle comprising a deflectable conditionally stable elastic column mounted for rotation within said rotor, said column being relatively long along its longitudinal axis with respect to its cross-sectional area and having a non-linear elasticity characteristic whereby at a critical load associated with a critical angular speed of said rotor an appreciable increase in the rate of deflection versus load occurs, load-producing means mounted for rotation within said rotor and connected to said column for applying a load to said column representative of the angular speed of said rotor for deflecting said column, and throttling means mounted for rotation within said rotor responsive to the deflection of said column for controlling the flow of pressure fluid through said nozzle in accordance therewith thereby precisely regulating the angular speed of said rotor.

4. A governor as claimed in claim 3 in which said load-producing means and said throttling means comprise a single element.

5. A governor as claimed in claim 3 including means mounted for rotation within said rotor for applying a predetermined preload to said column thereby causing a predetermined initial deflection of said column.

6. A governor as claimed in claim 5 wherein said means for applying a predetermined preload includes means for applying said preload in a direction along said longitudinal axis and said load-producing means includes means for applying a load in a direction perpendicular to said longitudinal axis.

References Cited by the Examiner
UNITED STATES PATENTS

| | | | |
|---|---|---|---|
| 2,292,090 | 8/1942 | Reichel | 74—5.9 X |
| 2,364,810 | 12/1944 | Noxon | 74—5.7 X |
| 3,162,053 | 12/1964 | Blitz | 74—5.7 |

FRED C. MATTERN, JR., *Primary Examiner.*

J. D. PUFFER, *Assistant Examiner.*